United States Patent Office.

ELMOR J. SALISBURY, OF SAN FRANCISCO, CALIFORNIA, ASSIGNOR TO HIMSELF AND GEORGE A. BRUSH, OF SAME PLACE.

Letters Patent No. 102,869, dated May 10, 1870.

IMPROVEMENT IN PRESERVING AND HARDENING STONE, BRICK, &c.

The Schedule referred to in these Letters Patent and making part of the same.

*To all to whom it may concern:*

Be it known that I, ELMOR J. SALISBURY, of the city and county of San Francisco, State of California, have invented an Improved Process for Preserving and Hardening Stone, Brick, Cement, and other materials used in building; and I do hereby declare that the following is a full, clear, and exact description of my process, sufficient to enable any person skilled in the art or science to which it relates to use the same without further invention or experiment.

My invention has for its object improvements in preserving and hardening stone, brick, cement and other building materials; and It consists, first, in applying, in succession, to the stone, or other material to be treated, a solution of fluid mixture of magnesia and a solution of silica, by preference, an alkaline silicate.

In carrying out this part of my invention, I prefer to employ a solution of magnesia, containing two pounds magnesia to a gallon of water. This solution I apply to the surface of the stone or other material by means of a brush, or, when more convenient, the stone or other substance may be immersed in the solution, so as to charge the stone or substance as much as possible with the said solution.

This operation may be repeated until the stone or material has become saturated to the depth required. Afterward I coat the surface of the stone or material with a solution of soluble silicate or a mixture of soluble silicates, such, for instance, as a combination of silicate of soda and silicate of potash, which I prefer to be as neutral as possible.

The specific gravity of the solution of soluble silicate I find most convenient for general application is about thirteen hundred, but this may be increased or lowered to meet the circumstances of the case.

In case it should be desirable to change the color of the stone or other material acted upon, suitable coloring agents may be used in the solution.

Water-proofing and hardening deeply into the stone or material, or, if a very porous material is to be operated upon, stronger solutions than those above given might be employed.

By this means I render bricks or other porous building material of equal durability with the most solid stone.

Having thus described my invention,

What I claim, and desire to secure by Letters Patent, is—

Hardening and preserving stone, bricks, cement, and other building materials by applying the abovementioned ingredients in about the proportions and manner above specified.

In witness whereof I have hereunto set my hand and seal.

ELMOR J. SALISBURY. [L. S.]

Witnesses:
WM. R. BOONE,
J. LEE BOONE.